A. LAHTI.
BEET HARVESTER.
APPLICATION FILED JULY 25, 1913.
1,123,897.
Patented Jan. 5, 1915.
2 SHEETS—SHEET 1.
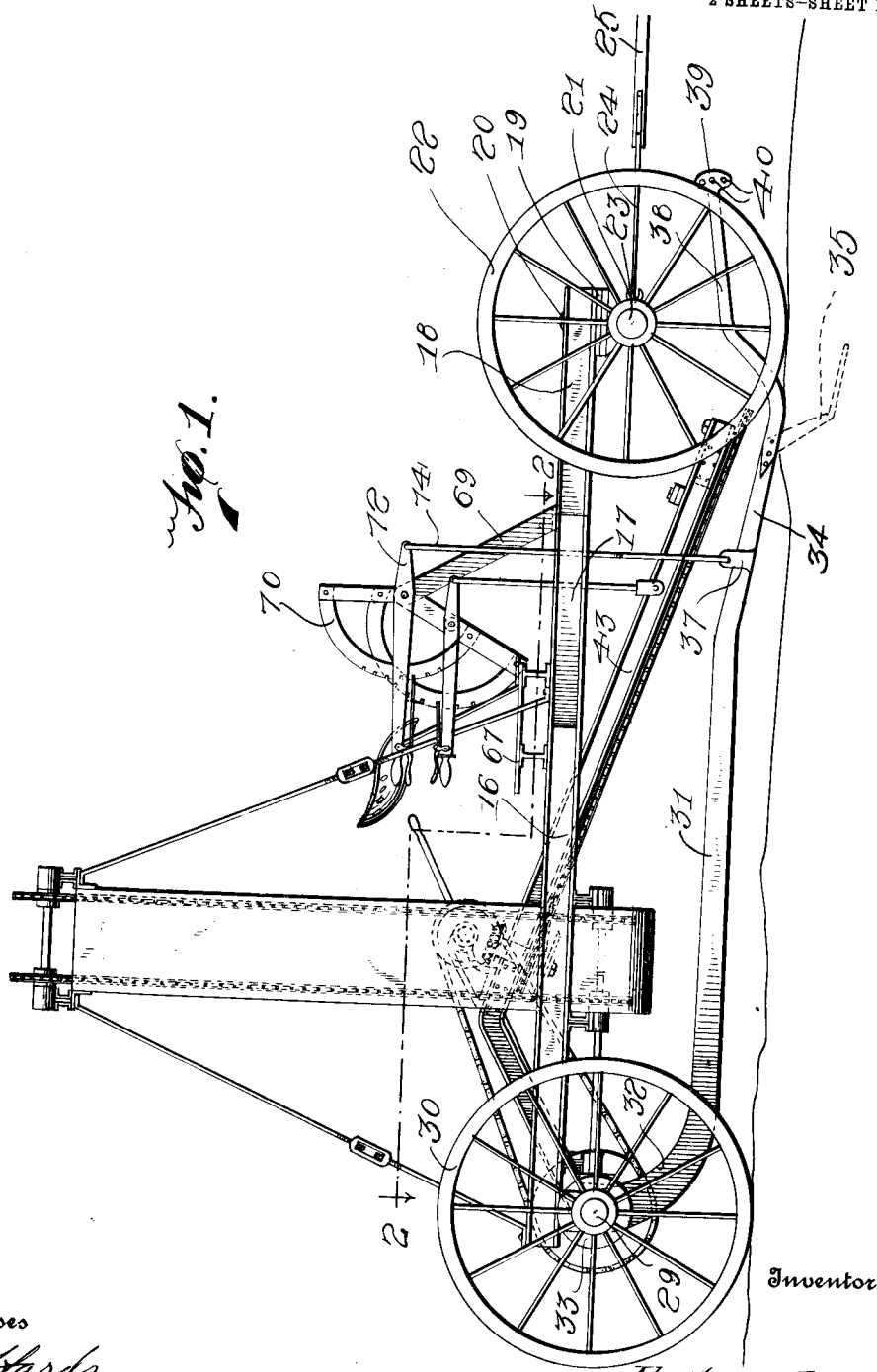

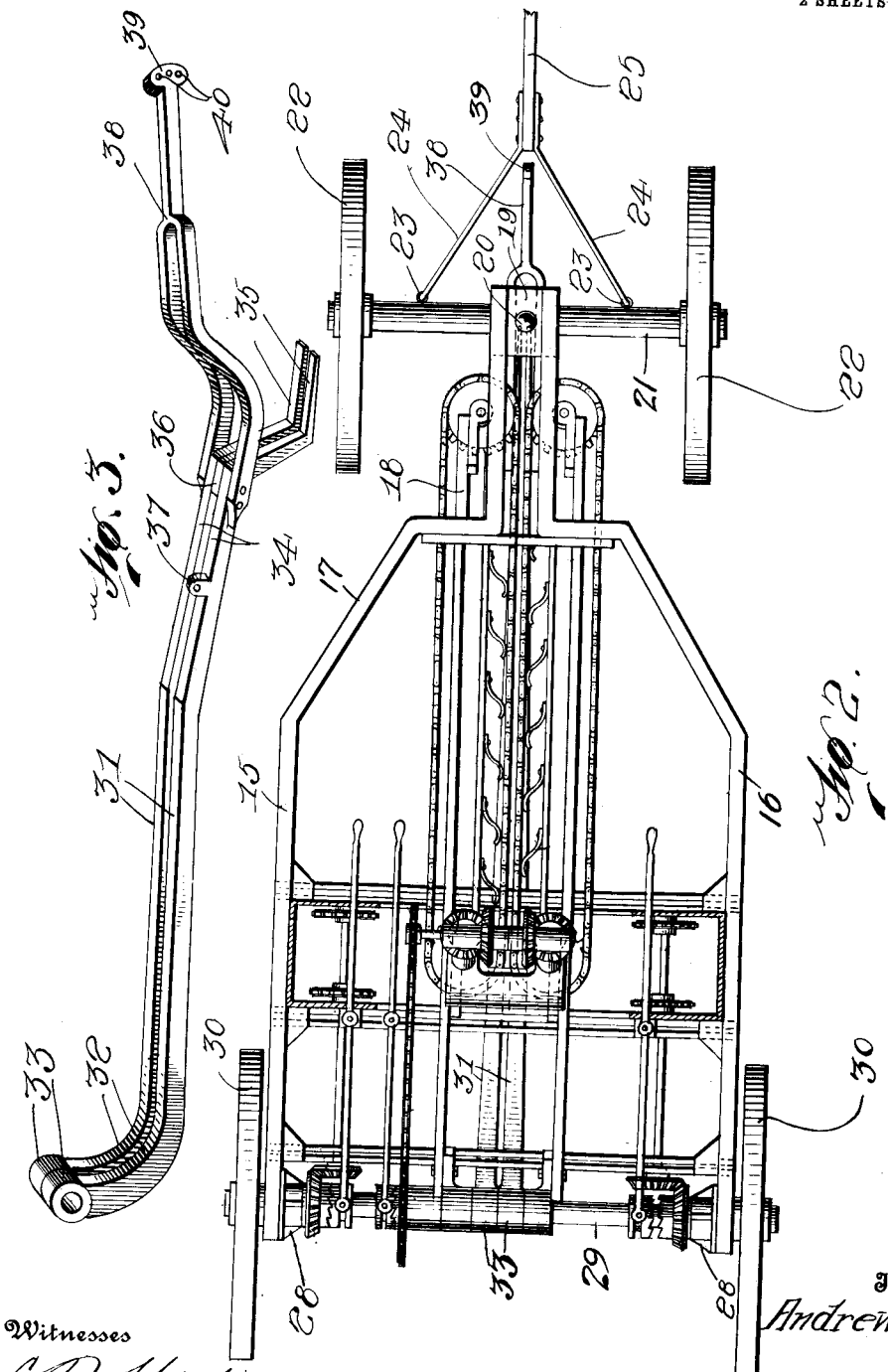

UNITED STATES PATENT OFFICE.

ANDREW LAHTI, OF RED LODGE, MONTANA.

BEET-HARVESTER.

1,123,897. Specification of Letters Patent. Patented Jan. 5, 1915.

Application filed July 25, 1913. Serial No. 781,191.

*To all whom it may concern:*

Be it known that I, ANDREW LAHTI, a citizen of Russia, residing at Red Lodge, in the county of Carbon and State of Montana, have invented certain new and useful Improvements in Beet-Harvesters, of which the following is a specification, reference being had therein to the accompanying drawing.

This invention relates to a beet harvester and the principal object of the invention is to provide a harvester with an improved construction whereby the beets may be dug up from the ground and conveyed to a suitable receiver.

A further object of the invention is to provide an improved digging mechanism which may be adjusted to dig at the depth desired.

With these and other objects in view, this invention consists of certain novel constructions, combinations and arrangements of parts, as will be hereinafter fully described and claimed.

This invention is illustrated in the accompanying drawings, wherein:—

Figure 1 is a side elevation of the beet harvester. Fig. 2 is a sectional view through the harvester along the line 2—2 of Fig. 1. Fig. 3 is a perspective view of the digging means.

Referring to the accompanying drawings, it will be seen that this invention comprises a frame having the side-bars 15 and 16 which have their forward end-portions 17 brought together and extended to form arms 18, which are connected by a block 19. This block carries a pin 20 extending through the axle 21 and thus pivotally mounting the axle so that the axle may be turned when it is desired to turn the machine. This forward axle 21 carries the supporting wheels 22 and also carries the eyes 23 with which the connecting-rod 24, for the tongue 25, are connected. The rear portions of the side-bars 15 and 16 carry bearings 28 in which the axle 29 is rotatably mounted. This axle 29 carries the supporting wheels 30 and constitutes a driving shaft for the mechanism to be hereinafter described, since it rotates with the wheels 30 and by means of suitable gearings operates the mechanism of the digger.

The beet-digger mechanism is carried by the axle 29 and comprises the two beams 31 which have their inner end-portions 32 curved upwardly and terminating in bearing sleeves 33 through which the axle 29 passes. The forward end-portions of the beams 31 are bent downwardly, as shown at 34, and have their free ends bent to form the digging blades 35 which are held in spaced relation by the block 36 and thus pass upon opposite sides of the beet which is to be dug up.

A lug 37 is carried by one of the beams 31 so that a lever may be connected with the lug and the frame for vertically adjusting the digger.

A fork 38 is connected with the forward ends of the beams 31 and has its outer end formed into a head 39 provided with perforations 40 so that a draft appliance may be connected with the fork, while the portion of the fork adjacent the bars will ride upon the ground for preventing the blades 35 from digging too deep.

A platform 67 is carried by the frame and forms a support for one end of the angle member 69 which carries the rack 70 of the latch lever 72.

The latch lever 72 is connected with the free end portion of the digging mechanism by means of the rod 74.

From inspection of Fig. 1 it will be readily seen that by adjusting the position of the lever the vertical position of the digging mechanism may be changed.

From the foregoing description it will be seen that a simple and efficient digging mechanism has been produced which may be easily adjusted and which is so formed as to easily dig the beets and ride evenly upon the ground without danger of digging too deep.

What is claimed is:

1. In a beet digger, the combination with a supporting frame, a beet digging mechanism pivotally secured to said frame, said beet digging mechanism comprising a pair of parallel arms, said arms provided at their inner ends with upwardly curved portions having enlarged bearing sleeves, said sleeves adapted to abut against each other for holding the rear ends of said arms in spaced relation, depending fingers integrally formed upon the forward ends of said arms, forwardly extending digging blades integrally formed upon said depending fingers, a block fixed between the forward ends of said arms for holding said fingers and digging blades in spaced relation whereby said digging blades can straddle the side portions of a beet for digging the same from the ground, means carried by said supporting frame and connected to said arms for vertically adjusting the digging mechanism, a fork fixedly secured to said arms, whereby said fork will straddle the forward ends of said arms and brace the same against spreading, said fork provided with a portion extending beyond said fingers to engage the upper surface of the ground thereby preventing said digging blades from digging too deep, said fork terminating in an upwardly extending portion adapted to be attached to a draft appliance.

2. In a beet digger, the combination with a supporting frame, a beet digging mechanism pivotally secured to said frame, said beet digging mechanism comprising a pair of parallel arms, said arms provided at their inner ends with upwardly curved portions having enlarged bearing sleeves, said sleeves adapted to abut against each other for holding the rear ends of said arms in spaced relation, depending fingers integrally formed upon the forward ends of said arms, forwardly extending digging blades integrally formed upon said depending fingers, a block fixed between the forward ends of said arms for holding said fingers and digging blades in spaced relation whereby said digging blades can straddle the side portions of a beet for digging the same from the ground, a fork fixedly secured to said arms, whereby said fork will straddle the forward ends of said arms and brace the same against spreading, said fork provided with a portion extending beyond said fingers to engage the upper surface of the ground, thereby preventing said digging blades from digging too deep, said fork terminating in an upwardly extending portion adapted to be attached to a draft appliance.

3. In a beet harvester, the combination with a supporting frame, a beet digging member pivotally secured to said frame, said digging member provided with integral offset digging blades, and a fork fixedly secured to said digging member, said fork provided with a forwardly extending portion positioned above said digging blades and terminating in an upwardly extending portion of said fork adapted to ride upon the surface of the ground above said digging blades for preventing said blades from digging too deep.

4. In a beet harvester the combination with a beet digging mechanism, said beet digging mechanism comprising a pair of parallel arms, means for holding said arms in parallel spaced relation, means fitting over the outer sides of said arms for holding the same against spreading, said arms provided with parallel spaced digger blades, whereby beets may pass between said blades and be removed from the ground, and means fixed to the forward ends of said arms for limiting the downward movement of the same.

In testimony whereof I hereunto affix my signature in presence of two witnesses.

ANDREW LAHTI.

Witnesses:
 JOHN G. SKINNER,
 VICTOR AHO.